No. 763,735. PATENTED JUNE 28, 1904.
P. T. DODGE.
LINOTYPE MACHINE.
APPLICATION FILED OCT. 20, 1903.
NO MODEL. 3 SHEETS—SHEET 1.
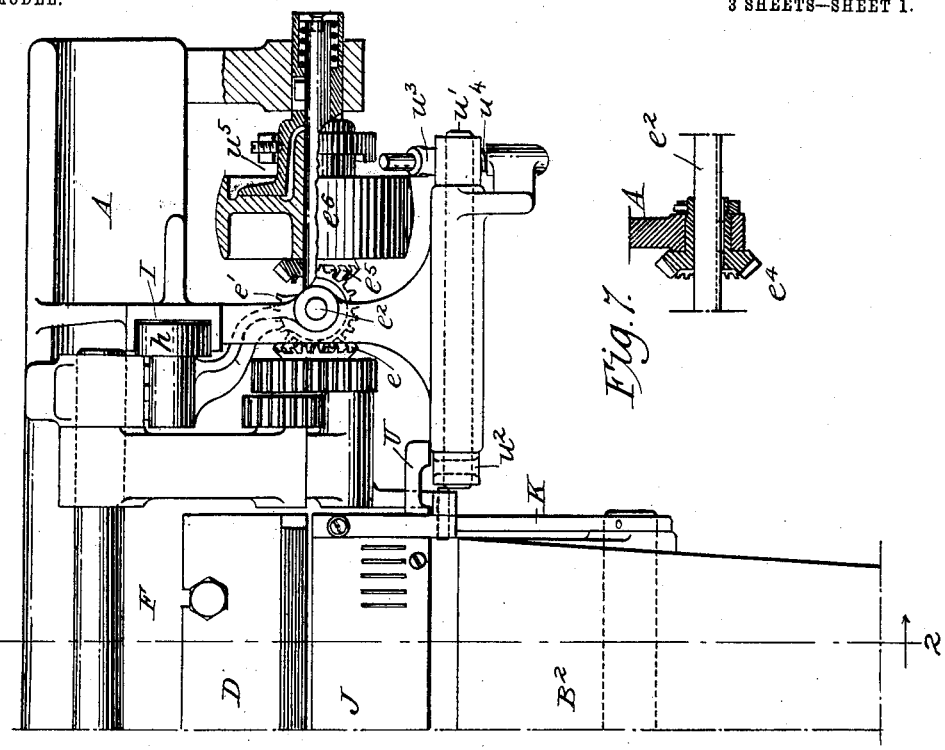
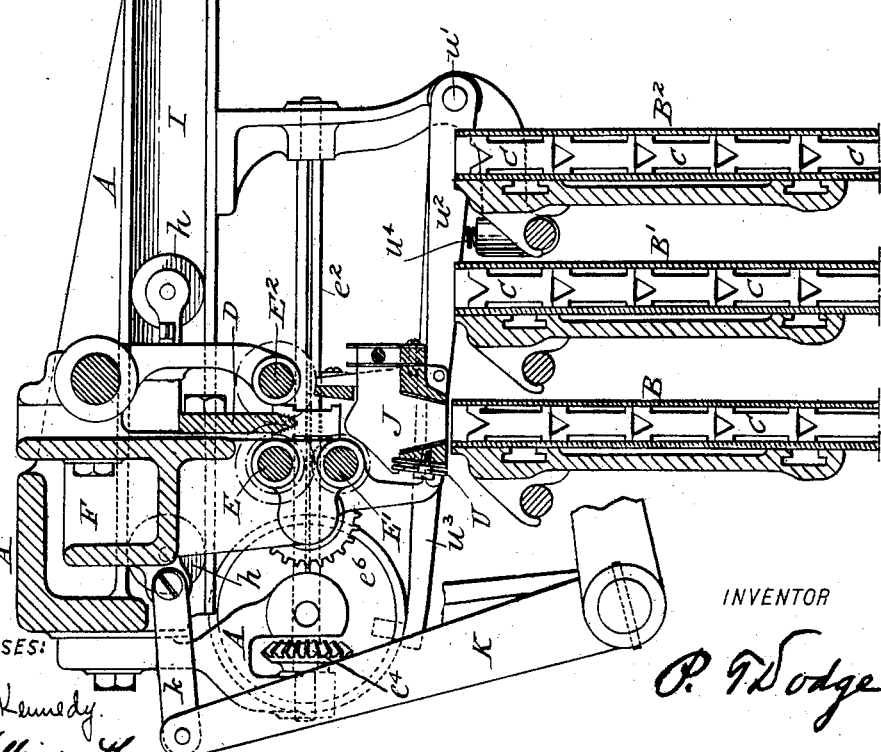
WITNESSES:
A. M. E. Kennedy.
S. P. Hollingsworth.
INVENTOR
P. T. Dodge

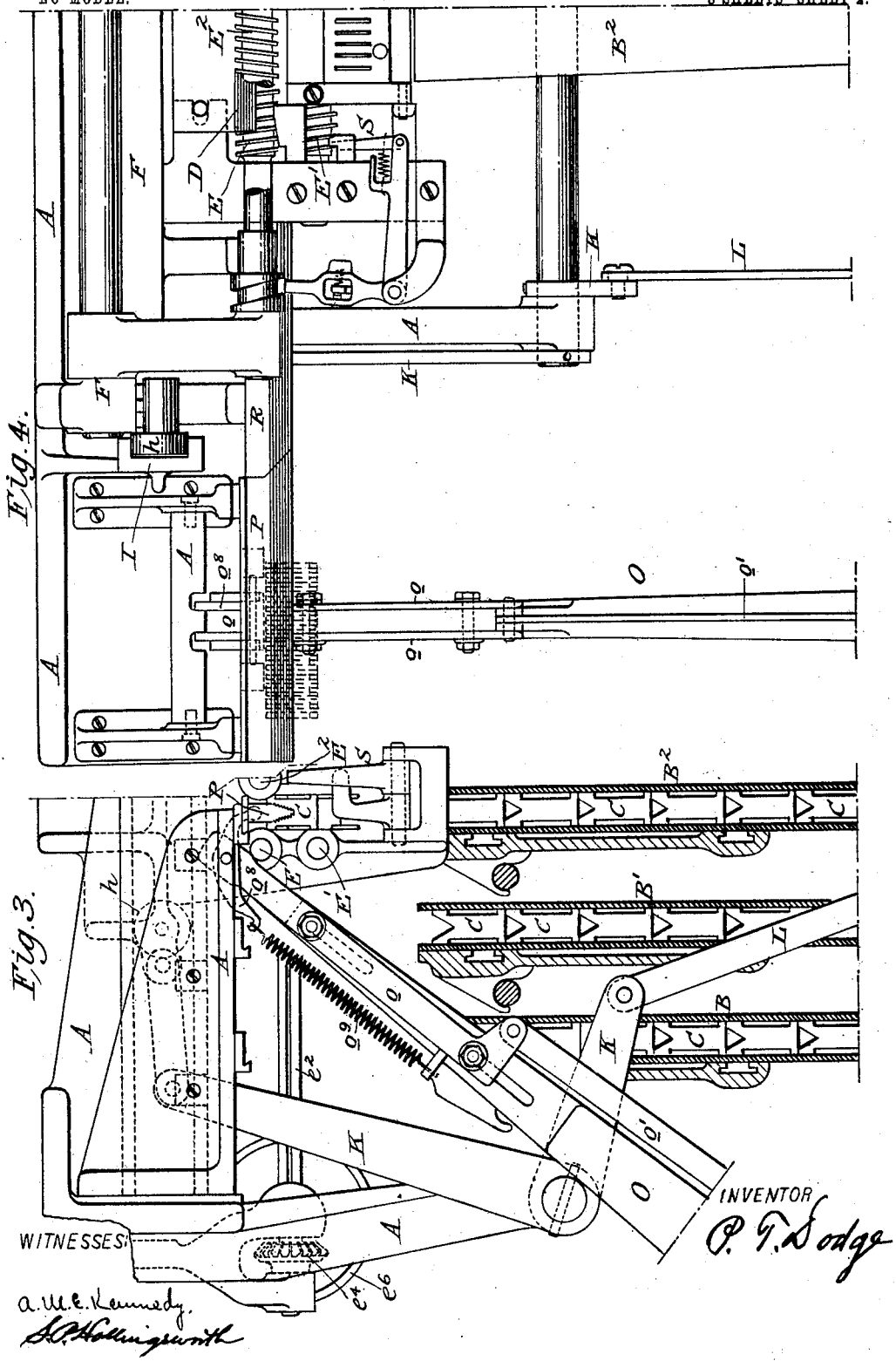

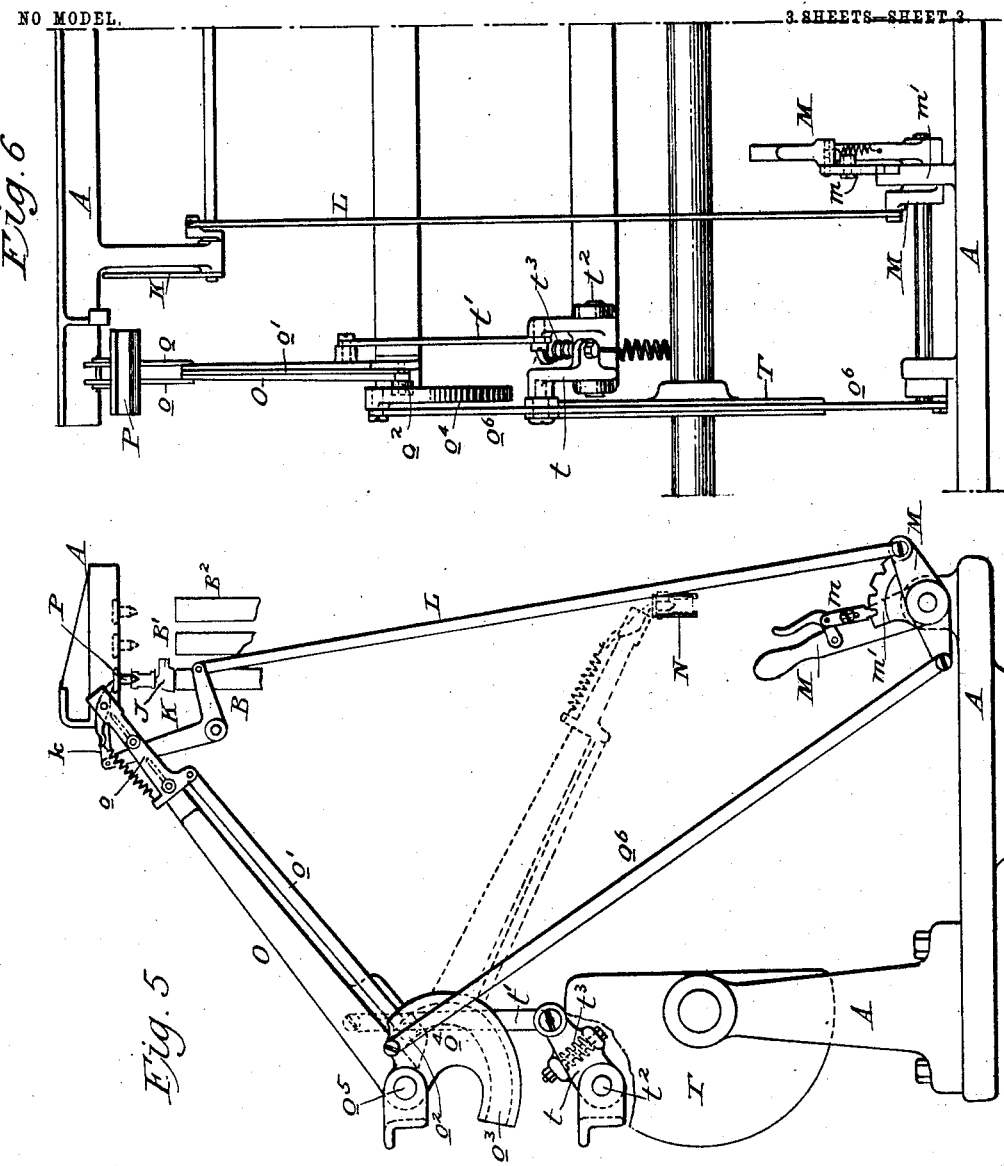

No. 763,735. Patented June 28, 1904.

UNITED STATES PATENT OFFICE.

PHILIP T. DODGE, OF BROOKLYN, NEW YORK, ASSIGNOR TO MERGENTHALER LINOTYPE COMPANY, A CORPORATION OF NEW YORK.

LINOTYPE-MACHINE.

SPECIFICATION forming part of Letters Patent No. 763,735, dated June 28, 1904.

Application filed October 20, 1903. Serial No. 177,738. (No model.)

*To all whom it may concern:*

Be it known that I, PHILIP T. DODGE, of Brooklyn, county of Kings, and State of New York, have invented a new and useful Improvement in Linotype-Machines, of which the following is a specification.

My invention relates generally to typographic machines wherein type matrices or dies are stored in magazines or holders, from which they are discharged individually in the order required, assembled temporarily in line for use in connection with casting or indenting mechanism, and thereafter returned to the magazines from which they started.

Machines have heretofore been made in various forms with a plurality of magazines carrying matrices or dies for different fonts or faces of type, so that those of one face or another can be called into use as demanded.

My present invention has reference solely to the distribution of matrices in machines having two or more magazines. It has in view the employment of a single distributing mechanism for distributing the matrices to either one of the magazines at will.

To this end it consists, essentially, in the combination, with two or more magazines which are normally fixed in position, of distributing mechanism which is relatively movable, so that it may be brought into operative relation to any one of the magazines.

My invention further consists in means for delivering the assembled line of matrices or dies from one and the same point in the machine to a distributing mechanism at either of the various points at which it may be located.

The invention also consists in combining with an adjustable or variable matrix-delivering mechanism and the adjustable distributer a common adjusting mechanism whereby their speedy adjustment may be effected and their proper relationship insured.

Referring to the accompanying drawings, Figure 1 is a vertical section on the line 2 2, Fig. 2, from front to rear of the top of a machine containing three magazines in combination with my shifting distributer. Fig. 2 is a rear elevation of the same, including only the right side of the machine. Fig. 3 is an end elevation of the parts shown in Figs. 1 and 2, the magazines being represented in section. Fig. 4 is a rear elevation on the left side of the machine. Fig. 5 is an outline elevation showing more particularly the adjustable elevator or carrier for presenting the line of matrices to the distributer in its several positions. Fig. 6 is a front elevation of the same. Fig. 7 is a sectional elevation of a detail.

As my invention has reference solely to means for delivering the matrices to two or more magazines, I have limited the drawings to the parts immediately associated with the invention. The matrices, the assembling, justifying, and casting mechanisms, and all other parts of the machine may be identical with those of the commercial Merganthaler linotype or of any other suitable construction.

Referring to the drawings, A represents the rigid frame of the machine, and B B' B² are three parallel upright magazines adapted to receive the matrices C C of different styles or fonts. These magazines may be of any suitable construction and sustained in position in any suitable manner; but they are preferably made like those of the ordinary Merganthaler machine—of two parallel plates grooved in their opposing faces to receive and guide the ears or edges of the matrices, which enter at the upper end and escape at the lower.

D represents a horizontal distributer-bar similar to that in use in the ordinary Mergenthaler machine, its lower edge being made of V-section and provided with longitudinal teeth to engage corresponding teeth in the upper notched ends of the matrices. The teeth of the bar and the matrices are permuted in a manner well understood, so that matrices carried onto the bar at one end will be held in suspension until they arrive over the respective magazine-channels, into which they fall by gravity.

E E' E² represent three screws lying parallel with the distributer-bar in order to engage the edges of the matrices and carry them along the bar. Heretofore the distributer-bar and screws have been mounted in a fixed position in the machine, with the distributer-bar permanently over the mouth or entrance to one magazine. In carrying my invention into effect I mount them in a frame or support F, mounted to slide horizontally forward and backward in the main frame A, so that the distributer may be brought over and in operative relation to either one of the magazines at will.

In Fig. 1 the distributer-bar is shown in position to deliver matrices to the magazine B, while in Fig. 3 it is shown in position to deliver to magazine $B^2$. The essence of the invention in this regard lies in mounting the distributer as a whole so that it may be moved in relation to several magazines to distribute the matrices into one or the other, as demanded.

The construction of the frame supporting the distributer may be varied at will, and it may be supported and guided in any suitable manner, provided only that it is adapted to permit the movement of the distributer.

In the drawings the supporting-frame F is shown as provided with supporting-rollers $h$, which travel on a horizontal track or guide I on the main frame. To the distributer-frame F below the distributer-bar is secured a magazine throat or entrance J, consisting of a frame having a series of upright parallel partitions to assist in guiding the falling matrices into the magazine-channels, this throat being analogous to those used in linotype-machines. The movement of the distributer-frame may be effected by any suitable means. In the drawings I have shown an adjusting-lever K mounted on a horizontal shaft and connected at its upper end by a link $k$ to the distributer-frame. There will be two of these levers K, one at each end of the distributer, in order to insure its alinement with the magazines.

The adjusting-lever K is of angular form and is connected, as shown in Figs. 5 and 6, by a rod L to one end of an angular hand-lever M, mounted on the main frame and provided with a locking dog or latch $m$ to engage the fixed notched plate $m'$, whereby the distributer is locked in its various positions.

The feed-screws of the distributer are geared together at one end, as usual. They receive motion through a beveled pinion $e$, fixed to one of the screws and driven by a beveled pinion $e'$ on a horizontal slotted shaft $e^2$, seated in the main frame and extending in a fore-and-aft direction. The pinion $e'$ is splined to the shaft in order to slide forward and backward along the same with the distributing mechanism. The shaft $e'$ receives motion at one end from a beveled pinion $e^4$, secured thereon and engaging a like pinion $e^5$ on the hub of a constantly-driven pulley $e^6$.

It will be observed that the above arrangement of parts permits the distributer to be moved forward and backward without in the least interfering with the driving of the feed-screws.

The composed lines of matrices which are to be presented for distribution will all be lifted from one and the same point in the machine. If a machine is of the ordinary Mergenthaler pattern, the matrix-line will be supported in a fixed intermediate channel N, as shown in Fig. 5. A change in the position of the distributer from one magazine to the other will of course necessitate a corresponding change in the path of the matrices to the distributer, one line being required to be distributed in the first magazine, another in the second, &c. I therefore provide an elevator or lifting mechanism the path of which may be changed. This may be variously constructed, the only essential requirement being that although receiving the matrices always at the same point it may be adjusted to deliver them at different points, according to the different positions of the distributer.

In the form shown the elevator consists of a vertically-swinging lever O, carrying at one end a pendent bar or plate P, toothed horizontally in its lower edge to engage with and sustain the line of matrices in the same manner as the second elevator of the Mergenthaler linotype. The elevating-arm differs, however, from that of the Mergenthaler machine in that it is extensible or variable in length, so that on rising to its uppermost position its bar P will present the matrix-line in one position or another, as demanded and as shown by dotted lines in Fig. 5.

The end of the arm which carries the bar P is made in a separate piece $o$ and mounted to slide endwise on the main portion, the connection being made by longitudinal slots and bolts, as shown in the drawings, or in any other convenient manner. From the sliding portion $o$ a controlling-bar $o'$ is extended downward and provided at its lower end with a roller $o^2$, arranged to travel in a groove $o^3$ in a cam-plate $o^4$, which stands normally at rest. This cam-plate is mounted, however, to turn around a shaft or axis $o^5$ on the arm O, its adjustment being effected and its position maintained by a rod $o^6$, jointed to the plate at one end and jointed at the opposite end to the hand-lever M, before mentioned.

As the arm O swings upward and downward the roller $o^2$ traverses the groove in the cam-plate and controls the sliding motion of the end of the arm O, thus determining the position of the elevator-bar P and the matrix-line when they reach their uppermost position. By moving the hand-lever M, and thereby turning the cam-plate $o^4$ to suitable positions, the elevator will be caused to present the matrices in line with one magazine or another. Owing to the fact that the distributer-shifting devices and the elevator-controlling devices are connected to the one lever it follows that the movement of the latter to set the distributer over a particular magazine will at the same time effect the adjustment of the matrix-elevator to cause a corresponding delivery of the matrix-line.

The elevator-plate P on reaching its uppermost position forms a close union at one end with a toothed bar R, onto which the matrix-line is shifted endwise from the elevator P. The line is pushed along the bar R and the matrices presented successively to the lifting device S, whereby they are raised between the carrier-screws for arrangement by the distributer-bar. The construction and operation of these parts may be the same as in the Mergenthaler machine.

The elevator-bar P is suspended, as usual, from the end of the arm O by a pivoted link $o^8$, acted upon by a spring $o^9$, so that as the arm completes its upward motion the bar P is forced with spring-pressure to its seat in the frame, whereby perfect alinement with the bar R is insured.

The elevator-arm O may be operated by any suitable mechanism. As shown in the drawings, it is actuated by a cam T, acting through an intermediate lever $t$ and link $t'$. The lever $t$ is preferably formed in two parallel parts mounted on a common pivot $t^2$ and connected through the medium of a compression-spring $t^3$, adapted to give an overmotion to arm O, whereby it is forced upward with a yielding pressure, so that the various parts are certain to come to their proper positions.

All linotype-machines are provided with automatic means for stopping the action of the distributer-screws in the event of a matrix lodging in the throat or entrance to the magazine. This device consists of a bar U, controlling a driving-clutch and extended lengthwise of the distributer-throat in engagement with the laterally-yielding partition-plates therein, so that whenever a matrix lodges improperly between the partitions and is carried laterally by one of the screws it will move the partition-plate laterally and effect the end motion of the bar U.

The clutch-controlling device consists of a rock-shaft $u'$, provided at one end with an arm $u^2$, underlying the bar U, and provided at the opposite end with an arm $u^3$, urged upward by a spring $u^4$ and adapted to engage a cam-shaped collar on the clutch $u^5$, which imparts motion from the pulley $e^6$ to the distributer-screws. The bar U normally holds the arm $u^2$ downward, thereby keeping the arm $u^3$ out of engagement. When, however, a lodged matrix carries one of the partitions laterally, it causes the bar U to move endwise, thereby releasing the arm $u^2$, whereupon the arm $u^3$, rising into engagement with the clutch, throws it out of action. These parts are essentially the same as in the ordinary Mergenthaler machine. The difference lies principally in the fact that the arm $u^2$ in the present structure is extended past the three magazines, so that it is in operative relation to the bar U when the distributer is in either of its various positions.

It will be understood that the delivery of matrices from the respective magazines may be controlled by any suitable mechanism and that devices of any appropriate character may be used to effect their assemblage to the line in the course of composition and for finally delivering the composed line to the elevator herein shown.

I believe myself to be the first to provide a distributing mechanism which may be shifted or changed in position to deliver to one magazine or another at will, and it will of course be understood that the distributing mechanism and the magazines may be of any ordinary or suitable construction and that the details may be generally modified within the limits of mechanical skill. I also believe myself to be the first to provide in a typographic machine means by which a line of assembled matrices or dies may be presented bodily to one point or another preparatory to their distribution.

Having thus described my invention, what I claim is—

1. In a typographic machine, a supporting-frame in combination with a distributing mechanism movable bodily therein to different operative positions.

2. In a typographic machine, plural magazines in combination with a distributer movable in relation thereto, whereby it may be caused to deliver to one magazine or another, as demanded.

3. In a typographic machine, two or more stationary magazines, in combination with the sliding distributer adapted to be set in operative relation to either magazine at will.

4. In a typographic machine, two or more upright parallel magazines fixed in position, in combination with a distributing mechanism movable over the receiving ends of the magazines, and means for moving and locking the distributer, whereby it may be caused to distribute to one magazine or another, as required.

5. In a typographic machine, the combination of two or more magazines, a distributer movable in relation thereto, a fixed driving-wheel, and adjustable driving connections between said wheel and the distributer, whereby the distributer may be actuated in its various positions.

6. In a typographic machine, a movable distributer, a driving-clutch and connections through which it operates the distributer in its various positions, and a clutch-controlling device adapted to be operated by the distributer, in the various positions of the latter.

7. In a typographic machine, the combination of a distributer, movable to different operative positions, and means for presenting the matrices to the distributer in each of its positions.

8. In a typographic machine, a distributer movable bodily to different operative positions, in combination with an elevator for composed lines of matrices, having a variable movement, whereby the lines may be delivered at different points corresponding to the position of the magazine.

9. In a typographic machine, a swinging arm provided with means for carrying a line of matrices, in combination with means for changing the path of the arm.

10. In a typographic machine, a carrier for a composed line of matrices, in combination with means for changing the path of the carrier.

11. In a typographic machine, an arm adapted to sustain and carry a composed line of matrices, mounted to swing about an axis and adjustable in length, whereby the path of the carrying end may be varied at will.

12. In a typographic machine, the swinging arm, extensible in length and adapted to carry a composed line of matrices, in combination with an adjustable device changing the length of the arm.

13. In a typographic machine, the swinging arm O, extensible in length, in combination with the adjustable cam and connections through which it controls the length of the arm.

14. In a typographic machine, a movable distributer, a matrix-line carrier adjustable as to its path of movement, and an adjusting mechanism connected with both the distributer and the line-carrier, whereby their proper operative relations may be maintained under various adjustments.

15. In a typographic machine, the swinging extensible arm O, adapted to carry a line of matrices, in combination with a shifting distributer, a lever M, and connections from said lever to the arm and the distributer, respectively, for changing the path of the former and the positon of the latter.

16. In a typographic machine, the swinging extensible elevator-arm O, its controlling-cam $o^4$, and connections therefrom, the shifting distributer, the lever K, and lever M, and connections therefrom to the cam and the lever K.

17. In a typographic machine, a distributer movable bodily to different operative positions in the machine, in combination with means for driving the distributer in its various positions.

In testimony whereof I hereunto set my hand, this 30th day of September, 1903, in the presence of two attesting witnesses.

PHILIP T. DODGE.

Witnesses:
JOHN F. GEORGE,
K. L. BRENNAN.